United States Patent Office 3,364,220
Patented Jan. 16, 1968

3,364,220
HETEROCYCLICAMINOALKYLGUANIDINES
John H. Biel, Milwaukee, Wis., and Jerry E. Robertson, St. Paul, Minn., assignors to Colgate-Palmolive Company, a corporation of Delaware
No Drawing. Continuation-in-part of application Ser. No. 142,529, Oct. 3, 1961. This application Nov. 13, 1963, Ser. No. 323,234
2 Claims. (Cl. 260—293)

ABSTRACT OF THE DISCLOSURE

Heterocyclicaminoalkylguanidines, wherein the heterocyclic amino moiety is polymethylenimino or azapolymethylenimino, either unsubstituted or having lower alkyl substituents on the heterocyclic ring, are disclosed. The guanidine grouping may bear an amino grouping on the position where the heterocycliaminoalkyl is attached. Corresponding heterocyclicaminoalkyl amines and hydrazines are disclosed as starting materials. The guanidine products are useful as anti-hypertensive agents.

---

This invention relates to novel chemical compounds and processes of preparing the same. More particularly, this invention is concerned with novel heterocyclicaminoalkyl derivatives, processes of producing such compounds and uses therefor.

This application is a continuation-in-part of our copending application Ser. No. 142,529 filed Oct. 3, 1961, and now abandoned.

According to one aspect of the present invention there are provided novel polymethyleniminoalkylguanidines of the formula

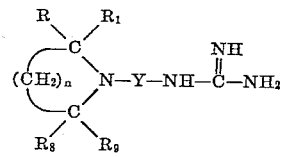

wherein $n$ is an integer from 2 to 5, R and $R_8$ are hydrogen or lower alkyls such as methyl, ethyl or propyl and $R_1$ and $R_9$ are lower alkyls such as methyl, ethyl, or propyl and Y is a lower straight or branched alkylene having at least two carbons in a straight chain between the nitrogens to which it is bonded such as ethylene, propylene and isopropylene, as well as novel intermediates and processes useful in producing such compounds.

The polymethyleniminoalkylguanidines can be produced by reacting a polymethyleniminoalkylhalide with ammonia to produce polymethyleniminoalkylamine which is then reacted with an O-alkyl isourea or S-alkyl isothiourea to form the desired polymethyleniminoalkylguanidine. This process can be represented as follows:

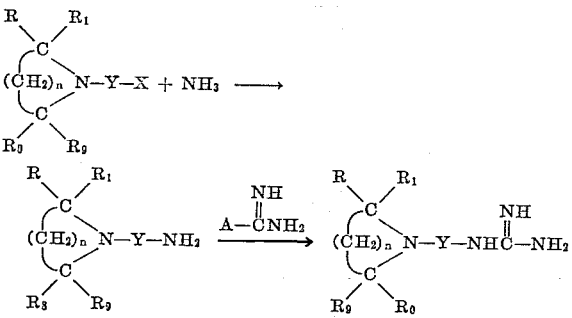

wherein X is a reactive halogen such as chlorine and bromine, A is O-lower alkyl or -S-lower alkyl in which the lower alkyl is a group such as methyl or ethyl, and $n$, R, $R_1$, $R_8$, $R_9$ and Y have the significance previously assigned.

The polymethyleniminoalkylhalides used as starting materials are either disclosed in the literature, such as J. Org. Chem. 16, 1929 (1951); J. Am. Chem. Soc. 76, 2317 (1954), and J. Am. Chem. Soc., 82, 1600 (1960), or they can be produced by halogenation of the corresponding polymethyleniminoalkanols, some of which are shown in J. Am. Chem. Soc., 77, 1568 (1955), and J. Am. Pharm. Assoc., Scientific Ed. 41, 643 (1952). Some specific polymethyleniminoalkylhalides which can be used in the process are N-(2-chloroethyl)-2,2,6,6-tetramethylpiperidine,
N-(2-chloroethyl)-2,2,5,5-tetramethylpyrrolidine,
N-(2-chloroethyl)-2,2,7,7-tetramethylhomopiperidine,
N-(3-chloropropyl)-2,2,6,6-tetramethylpiperidine,
N-(2-bromopropyl)-2,5-dimethylpyrrolidine,
N-(3-chloropropyl)-2,7-diethylhomopiperidine,
N-(3-chloropropyl)-2,8-dimethyl-octahydro-1-azocine and
N-(2-chloroethyl)-2,2,8,8-tetramethyl-octahydro-1-azocine.

Reaction between the polymethyleniminoalkylhalide, advisably in the form of an acid addition salt, and ammonia, used in excess, is readily effected at moderately elevated temperatures and in the presence of an organic solvent such as a lower alcohol. The reaction proceeds to near completion in a matter of a few hours. The product can be recovered from the reaction mixture by making it basic and extracting with an immiscible organic solvent such as ether.

Representative of the compounds which can be produced in this manner are

N-(2-aminoethyl)-2,2,6,6-tetramethylpiperidine,
N-(2-aminoethyl)2,2,5,5-tetramethylpyrrolidine,
N-(2-aminoethyl)-2,2,7,7-tetramethylhomopiperidine,
N-(3-aminopropyl)-2,2,6,6-tetramethylpiperidine,
N-(2-aminopropyl)-2,5-dimethylpyrrolidine,
N-(3-aminopropyl)-2,7-diethylhomopiperidine,
N-(3-aminopropyl)-2,8-dimethyl-octahydro-1-azocine and
N-(2-aminoethyl)-2,2,8,8-tetramethyl-octahydro-1-azocine.

The polymethyleniminoalkylguanidines are produced by bringing together a polymethyleniminoalkylamine and a O-lower alkyl isourea or S-lower alkyl isothiourea under liquid reaction conditions. Some of the urea reactants that can be used in the reaction are O-methyl isourea, O-ethyl isourea, S-methyl isothiourea and S-ethyl isothiourea. Such compounds are advisably used in the form of a mineral acid salt such as the sulfate. Solvents such as lower alcohols can be used as the reaction medium. Moderately elevated temperatures such as up to the reflux temperature can be used to promote the reaction. Removal of the alkanol or mercaptan by-product serves to bring the reaction to completion in about 1 to 3 hours. The desired product can be isolated from the reaction mixture by conventional procedures.

Some of the polymethyleniminoalkylguanidines which can be produced in this way are:

beta-(2,2,6,6-tetramethylpiperidino)-ethylguanidine,
gamma-(2,2,6,6-tetramethylpiperidino)-propylguanidine,
beta-(2,5-dimethylpyrrolidino)-ethylguanidine,
beta-(2,2,6,6-tetramethylpiperidino)-propylguanidine,
beta-(2,2,7,7-tetramethylhomopiperidino)-ethylguanidine,
beta-(2,6-dipropylpiperidino)-ethylguanidine and
gamma-(2,8-dimethyl-octahydro-1-azocino)-propylguanidine.

Acid addition salts, such as the hydrochloride, sulfate, phosphate, maleate, succinate, fumarate and benzoate, of the described novel amines and guanidines can be produced by conventional procedures.

According to another aspect of this invention there are provided novel N-amino-N-(polymethyleniminoalkyl)-guanidines of the formula

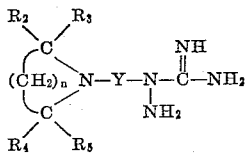

wherein $R_2$, $R_3$, $R_4$ and $R_5$ are hydrogen or lower alkyls such as methyl, ethyl and propyl and $n$ and $Y$ have the significance previously assigned, as well as novel intermediates and novel processes of producing such compounds.

The N-amino-N-(polymethyleniminoalkyl)-guanidines can be produced by reacting a polymethyleniminoalkylhalide with hydrazine to produce a polymethyleniminoalkylhydrazine which is then reacted with an O-lower alkyl isourea or a S-lower alkyl isothiourea, such as previously named, to form the desired N-amino-N-(polymethyleniminoalkyl)-guanidines. This process can be represented as follows:

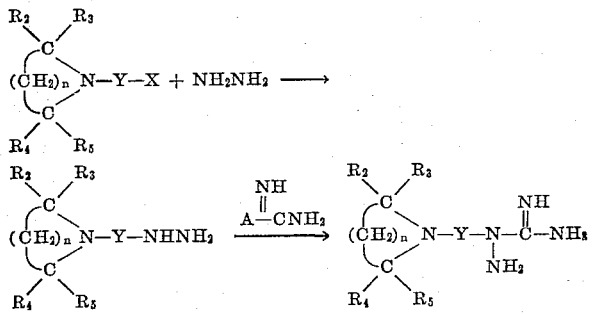

wherein $n$, $A$, $X$, $Y$, $R_2$, $R_3$, $R_4$ and $R_5$ have the assigned meaning.

Some of the polymethyleniminoalkylhalides which can be used in the process are:

N-(2-chloroethyl)-pyrrolidine,
N-(2-bromoethyl)-piperidine,
N-(2-chloroethyl)-homopiperidine,
N-(2-chloroethyl)octahydro-1-azocine,
N-(3-chloropropyl)-piperidine,
N-(2-bromopropyl)-homopiperidine, as well as the polymethyleniminoalkylhalides previously named containing nuclear alkyl substituents.

The polymethyleniminoalkylhalides can be reacted with hydrazine, advisably in considerable excess, at a moderately elevated temperatures such as the reflux temperature to produce the polymethyleniminoalkylhydrazines. The product can be recovered by conventional isolation procedures.

Some of the polymethyleniminoalkylhydrazines produced as described are:

beta-(piperidino)-ethylhydrazine,
beta-(pyrrolidino)-ethylhydrazine,
beta-(homopiperidino)-ethylhydrazine,
gamma-(piperidino)-propylhydrazine,
beta-(pyrrolidino)-propylhydrazine,
beta-(2,2,6,6-tetramethylpiperidino)-ethylhydrazine,
beta-(2,2,5,5-tetramethylpyrrolidino)-ethylhydrazine,
beta-(2,2,7,7-tetramethylhomopiperidino)-ethylhydrazine,
gamma-(2,2,6,6-tetramethylpiperidino)-propylhydrazine,
gamma-(2,5-dimethylpyrrolidine)-propylhydrazino
gamma-(2,7-diethylhomopiperidino)-propylhydrazine,
beta-(2,6-dipropylpiperidino)-propylhydrazine,
beta-(octahydro-1-azocinyl)-ethylhydrazine,
gamma-(octahydro-1-azocinyl)-propylhydrazine and
beta-(2,2,8,8-tetramethyl-octahydro-1-azocinyl)-ethylhydrazine.

The polymethyleniminoalkylhydrazines can be reacted with an O-lower alkyl isourea or an S-lower alkyl isothiourea under liquid reaction conditions to produce the N-amino-N-(polymethyleniminoalkyl)-guanidines. Aqueous lower alcohols can be used as the reaction medium. The O-lower alkyl isourea or S-lower alkyl isothiourea is advisably used in the reaction in the form of a mineral acid salt such as the sulfate. Elevated temperatures such as the reflux temperature are used to promote the reaction which is substantially complete in one to three hours. Removal of the by-product alkyl mercaptan or alcohol aids in driving the reaction to completion. The desired product can be recovered from the reaction mixture by conventional procedures.

Some of the N-amino-N-(polymethyleniminoalkyl)-guanidines which are produced as described are:

N-amino-N-(beta-piperidinoethyl)-guanidine,
N-amino-N-(beta-pyrrolidinoethyl)-guanidine,
N-amino-N-(beta-homopiperidinoethyl)-guanidine,
N-amino-N-(gamma-piperidinopropyl)-guanidine,
N-amino-N-(beta-pyrrolidinopropyl)-guanidine,
N-amino-N-[beta-(2,2,6,6-tetramethylpiperidino)-ethyl]-guanidine,
N-amino-N-[beta-(2,2,5,5-tetramethylpyrrolidino)-ethyl]-guanidine,
N-amino-N-[beta-(2,2,7,7-tetramethylhomopiperidino)-ethyl]guanidine,
N-amino-N-[gamma-(2,2,6,6-tetramethylpiperidino)-propyl]guanidine
N-amino-N-[gamma-(2,5-dimethylpyrrolidino)-propyl]-guanidine,
N-amino-N-[gamma-(2,7-diethylhomopiperidino)-propyl]-guanidine,
N-amino-N-[beta-(2,6-dipropylpiperidino)-propyl]-guanidine,
N-amino-N-[beta-(octahydro-1-azocinyl)-ethyl]-guanidine,
N-amino-N-[gamma-(2,2,8,8-tetramethyl-octahydro-1-azocinyl)-propyl]-guanidine and
N-amino-N-[beta-(2,2,6,6-tetrapropylpiperidino)-ethyl]-guanidine.

Acid addition salts, such as previously described, can also be prepared of the hydrazine and aminoguanidine compounds provided by this invention.

According to a further aspect of his invention there are provided novel heterocyclicaminoalkylguanidines and novel N-amino-N-(heterocyclicaminoalkyl)-guanidines of the formula

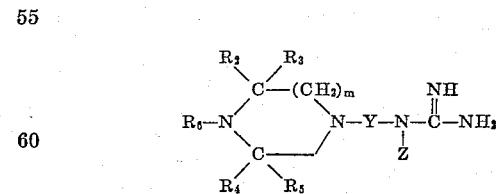

wherein $m$ is an integer from 1 to 3, $R_6$ is hydrogen or a lower alkyl such as methyl and ethyl, Z is hydrogen or $NH_2$ and $Y$, $R_2$ $R_3$, $R_4$ and $R_5$ have the significance previously assigned, as well as novel intermediates and novel processes of producing such compounds.

The production of the heterocyclicaminoalkylguanidines in which the heterocyclicamino group is a homopiperazino group can be achieved by reacting a 4-(haloalkyl)-homopiperazine with ammonia to form a 4-(aminoalkyl)-homopiperazine and then reacting said compound with an O-lower alkyl isourea or an S-lower alkyl isothiourea to produce the desired 4-homopiperazinoalkyl-guanidine. The process broadly can be represented as follows:

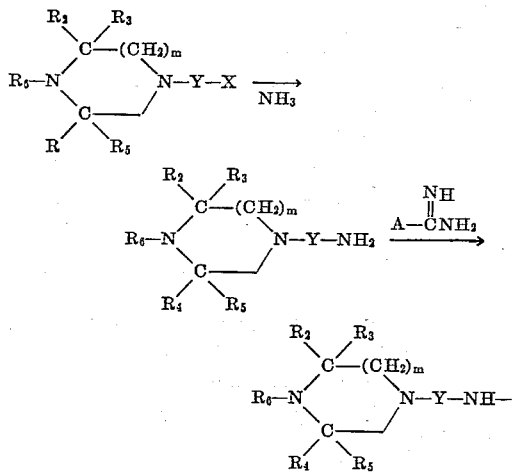

wherein $m$, $A$, $X$, $Y$, $R_2$, $R_3$, $R_4$, $R_5$ and $R_6$ have the significance previously assigned.

The 4-(haloalkyl)-heterocyclicamines used in the process are either disclosed in the prior art or can be produced from the known 4-(hydroxyalkyl)-heterocyclicamines by conventional halogenation techniques as with thionyl chloride. Some of the 4-(haloalkyl)-heterocyclicamines that can be used in the process are:

4-(beta-chloroethyl)-piperazine,
2,6-dimethyl-4-(gamma-bromopropyl)-piperazine,
4-(beta-chloroethyl)-homopiperazine,
1,2,2,6,6-pentamethyl-4-(beta-chloroethyl)-piperazine,
1,2,2,7,7-pentamethyl-4-(beta-chloroethyl)-homopiperazine,
1-propyl-2,6-diethyl-4-(beta-chloropropyl)-piperazine,
1-ethyl-2,7-dimethyl-4-(gamma-bromopropyl)-homopiperazine,
4(beta-chloroethyl)-octahydro-1,4-diazocine and
1,2,2,8,8-pentamethyl-4-(gamma-chloropropyl)-octahydro-1,4-diazocine.

The novel 4-(aminoalkyl)-heterocyclicamines can be produced by reacting the 4-(haloalkyl)-heterocyclicamines with ammonia using the conditions previously described herein in regard to amination of the polymethyleniminoalkylhalides.

Some of the 4-(aminoalkyl)-heterocyclicamines which can be produced by this reaction are:

4-(beta-aminoethyl)-piperazine,
2,6-dimethyl-4-(gamma-aminopropyl)-piperazine,
4-(beta-aminoethyl)-homopiperazine,
1,2,2,6,6-pentamethyl-4-(beta-aminoethyl)-piperazine,
1,2,2,7,7-pentamethyl-4-(beta-aminoethyl)-homopiperazine,
1-propyl-2,6-diethyl-4-(beta-aminopropyl)-piperazine,
1-ethyl-2,7-dimethyl-4-(gamma-aminopropyl)-homopiperazine,
4(beta-aminoethyl)-octahydro-1,4-diazocine and
1,2,2,8,8-pentamethyl-4-(beta-aminoethyl)-octahydro-1,4-diazocine.

The heterocyclicaminoalkylguanidines can be produced by reacting the 4-(aminoalkyl)-heterocyclicamines with an O-lower alkyl isourea or an S-lower alkyl isothiourea using the conditions referred to previously for the preparation of the polymethyleniminoalkylguanidines. Among the compounds which can be so produced are:

beta-(homopiperazino)-ethylguanidine,
beta-(piperazino)-ethylguanidine,
gamma-(piperazino)-propylguanidine,
gamma-(homopiperazino)-propylguanidine,
beta-(1,2,2,7,7-pentamethyl-4-homopiperazinyl)-ethylguanidine,
beta-(1,2,2,6,6-pentamethyl-4-piperazinyl)-ethylguanidine,
gamma-(1,2,2,6,6-pentamethyl-4-piperazinyl)-propylguanidine,
gamma-(1,2,2,7,7-pentamethyl-4-homopiperazinyl)-propylguanidine,
beta-(2,6-dipropyl-4-piperazinyl)-propylguanidine,
beta-(1-ethyl-2,6-dimethyl-4-piperazinyl)-ethylguanidine.
beta-(octahydro-(4)-1,4-diazocino]-ethylguanidine and
beta-[1,2,2,8,8-pentamethyl-octahydro-(4)-1,4-diazocino]-ethylguanidine.

The N - amino-N-(heterocyclicaminoalkyl)-guanidines are produced by reacting 4-(haloalkyl)-heterocyclamines with hydrazine to produce 4-(hydrazinoalkyl)-heterocyclicamines which upon reaction with an O-lower alkyl isourea or an S-lower alkyl isothiourea yield the desired N - amino-N-(heterocyclicaminoalkyl)-guanidines. This process can be represented as follows:

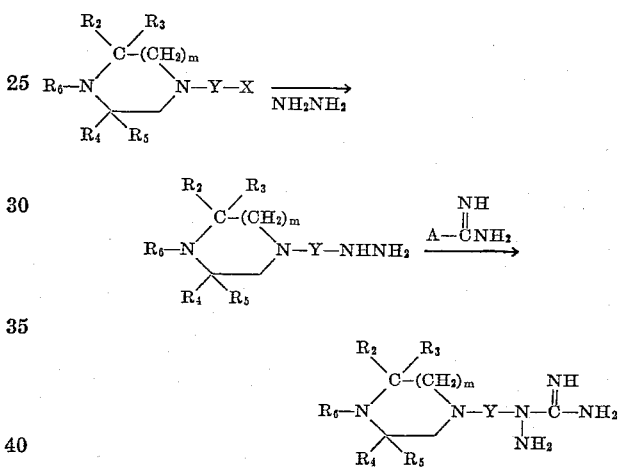

wherein $m$, $A$, $Y$, $R_2$, $R_3$, $R_4$, $R_5$ and $R_6$ have the significance previously assigned.

4-(haloalkyl)-heterocyclicamines such as those previously named can be used in the process. The reaction with hydrazine to form 4-(hydrazinoalkyl)-heterocyclicamines is achieved using the same conditions as those previously described for the reaction of polymethyleniminoalkylhalides with hydrazine.

Representative of the 4-(hydrazinoalkyl)-heterocyclicamines which can be produced are described are:

4-(beta-hydrazinoethyl)-piperazine,
4-(beta-hydrazinoethyl)-homopiperazine,
2,6-dimethyl-4-(gamma-hydrazinopropyl)-piperazine,
1,2,2,6,6-pentamethyl-4-(beta-hydrazinoethyl)-piperazine,
1,2,2,7,7-pentamethyl-4-(beta-hydrazinoethyl)-homopiperazine,
1-propyl-2,6-diethyl-4-(beta-hydrazinopropyl)-piperazine,
1-ethyl-2,7-dimethyl-4-(gamma-hydrazinopropyl)-homopiperazine,
4-(beta-hydrazinoethyl)-octahydro-1,4-diazocine and
1,2,2,8,8-pentamethyl-4-(gamma-hydraginopropyl)-octahydro-1,4-diazine.

The 4-(hydrazinoalkyl)-heterocyclicamines are converted to N - amino - N-(heterocyclicaminoalkyl)-guanidines upon reaction with an O-lower alkyl isourea or S-lower alkyl isothiourea using the conditions previously described for the reaction of the polymethyleniminoalkylamines wtih these reactants.

Among the N-amino-N-(heterocyclicaminoalkyl)-guanidines which can be produced are:

N-amino-N-{beta-[octahydro-(4)-1,4-diazocino]-ethyl}-
N-amino-N-(beta-piperazinoethyl)-guanidine,
N-amino-N-(gamma-piperazinopropyl)-guanidine,
N-amino-N-(gamma-homopiperazinopropyl)-guanidine,
N-amino-N-[beta-(1,2,2,7,7-pentamethyl-4-homopiperazinyl)-ethyl]-guanidine,
N-amino-N-[beta-(1,2,2,6,6-pentamethyl-4-piperazinyl)-ethyl]-guanidine,
N-amino-N-[beta-(1,2,2,6,6-pentamethyl-4-piperazinyl)-propyl]-guanidine,
N-amino-N-[gamma-(1,2,2,7,7-pentamethyl-4-homopiperazinyl)-propyl]-guanidine,
N-amino-N-[beta-(2,6-dipropyl-4-piperazinyl)-propyl]-guanidine,
N-amino-N-[beta-(1-ethyl-2,6-dimethyl-4-piperazinyl)-ethyl]-guanidine,
N-amino-N-{beta-[octahydro-(4)-1,4-diazocino]-ethyl}-guanidine and
N-amino-N-{gamma-[1,2,2,8,8-pentamethyl-octahydro-(4)-1,4-diazocino]-propyl}-guanidine.

Acid addition salts of the novel compounds of this invention, such as the sulfate, phosphate, succinate, maleate, fumarate and tartrate, can be produced by conventional methods. In fact, many of the compounds are formed as salts in the reactions and isolation techiques that can be used.

All of the guanidine and aminoguanidine compounds provided by this invention appear to have anti-hypertensive activity in animals, as do some of the alkylamino and alkylhydrazine intermediates, particularly those having 2,2,5,5; 2,2,6,6 and 2,2,7,7-tetraalkyl (particularly methyl) groups. The compounds in which Y is ethyl apparently are the most effective antihypertensive agents. The anti-hypertensive effect can be achieved in animals by oral or parenteral (intravenous) administration of the drug. Two of the compounds of particular interest as anti-hypertensives are N-amino-N-[beta-(1,2,2,7,7-pentamethyl-4-homopiperazinyl)-ethyl]-guanidine and N-amino-N-[beta-(octahydro-1-azocinyl)-ethyl]-guanidine.

To achieve an anti-hypertensive effect in an animal, including humans, one or more of the compounds can be administered as the base, or as a nontoxic acid addition salt, to the animal. Although the compounds can be administered as pure undiluted compounds, it is advisable to first combine one or more of the comopunds with a suitable pharmaceutical carrier to attain a more satisfactory size to dosage relationship.

Pharmaceutical carriers which are liquid or solid can be used. The preferred liquid carrier is water. Flavoring materials may be included in the solutions as desired.

Solid pharmaceutical carriers such as starch, sugar, talc and the like can be used to form powders. The powders may be used as such for direct administration or, instead, the powders may be added to suitable foods and liquids, including water, to facilitate administration.

The powders can also be used to make tablets, or to fill gelatin capsules. Suitable lubricants like magnesium stearate, binders such as gelatin, and disintegrating agents like sodium carbonate in combination with citric acid can be used to form tablets.

Unit dosage forms such as tablets, capsules and suppositories can contain any suitable predetermined amount of one or more of the compounds and they can be administered one or more at a time at intervals. Such unit dosages can contain, illustratively, from about 10 to 100 mg. of the compounds of this invention. Variation in activity between compounds is to be expected. Such variations are to be taken into account in utilizing these compounds. Such determinations are readily made by those skilled in the art. Daily dosage totals of about 50 to 500 mg. of the compounds of this invention are suitable, with the dosage being prescribed by a physician or a veterinary.

The following examples are presented to illustrate the invention.

*Example 1.—N-(2-hydroxyethyl)-2,2,6,6-tetramethylpiperidine*

To 28 g. of 2,2,6,6-tetramethylpiperidine in 100 ml. of methanol was added 10 g. of ethylene oxide and 0.5 ml. of concentrated hydrochloric acid. The mixture was heated at 100° C. for two hours in a bottle, cooled and reduced to dryness in vacuo. The residue was recrystallized from heptane to give 28 g. of product, M.P. 103–105° C.

*Analysis.*—Calcd. for $C_{11}H_{23}NO$: N, 7.50. Found: N, 7.55.

*Example 2.—N-(2-chloroethyl)-2,2,6,6-tetramethylpiperidine hydrochloride*

To 40 g. of N-(2-hydroxyethyl)-2,2,6,6-tetramethylpiperidine in 100 ml. of dry benzene was added 30 g. of thionyl chloride in 100 ml. of dry benzene. The mixture was stirred at reflux for two hours and then concentrated to dryness in vacuo. The residue was dissolved in 100 ml. of methanol, treated with charcoal, filtered, and the filtrate diluted with ether to the cloud point. Cooling gave a solid which was collected and dried to afford 48 g. of pure product, M.P. 225–228° C.

*Analysis.*—Calcd. for $C_{11}H_{23}NCl_2$: N, 5.83; Cl, 29.58. Found: N, 5.86; Cl, 29.70.

*Example 3.—N-(beta-aminoethyl)-2,2,6,6-tetramethylpiperidine*

To 36 g. (0.15 mole) of the salt obtained in Example 2 in a one liter autoclave was added 500 ml. of 10% ethanolic ammonia. The container was sealed and heated to 125° C. for 2.5 hours, then concentrated to dryness under vacuum. The resulting residue was dissolved in about 200 ml. of water, made strongly alkaline with potassium hydroxide and extracted with three 100 ml. portions of tetrahydrofuran. The combined organic layers were dried over potassium carbonate. After separation of the drying agent, the solvent was removed under vacuum to give a solid residue which amounted to 24 g. (87%) of product, M.P. 55–58° C.

*Analysis.*—Calcd. for $C_{11}H_{24}N_2$: N, 15.21. Found: N, 14.59.

*Example 4.—Di-[beta-(2,2,6,6-tetramethylpiperidino)-ethylguanidine] sulfate*

To 7.0 g. (0.025 mole) of S-methyl isothiourea sulfate in 100 ml. of 700% ethanol was added 9.5 g. (0.050 mole) of the base obtained in Example 3 in 25 ml. of benzene and the mixture was refluxed and stirred for six hours. After standing overnight at room temperature, the solid which formed was collected, triturated with ether and recrystallized from ethanol to afford 13 g. (96%) of product, M.P. 259–260° C.

*Analysis.*—Calcd. for $C_{24}H_{43}N_8O_4S$: N, 20.29; S, 5.80. Found: N, 19.52; S, 5.66.

*Example 5.—Beta-(2,2,6,6-tetramethylpiperidino)-ethyl hydrazine*

To 300 ml. of refluxing 85% hydrazine hydrate was added 48 gm. (0.20 mole) of the compound obtained in Example 2 in 100 ml. of water. After stirring and refluxing for 20 hours, the cooled mixture was made alkaline with excess potassium hydroxide and then extracted with three 150 ml. portions of ether. The separated and combined organic layers were dried over calcium carbonate. After removal of the drying agent and the solvent, the residue was fractionated through a 5″ column to afford two fractions. The fraction boiling at 89–90° C./0.4 mm. amounted to 10 g. (25%) and was taken as product.

*Analysis.*—Calcd. for $C_{11}H_{25}N_3$: N, 14.07. Found: N, 13.54. The second fraction, B.P. 165–168° C./0.4 mm., amounted to 22 g. and was taken as N, N-di-[beta-(2,2,6,6-tetramethylpiperidino)-ethyl]-hydrazine.

*Analysis.*—Calcd. for $C_{22}H_{46}N_4$: N, 11.48. Found: N, 11.10.

*Example 6.—N-amino-N-[beta-(2,2,6,6-tetramethylpiperidino)-ethyl]-guanidine sulfate*

To 4.9 g. (0.025 mole) of the mono-alkylhydrazine obtained in Example 5 in 60 ml. of 70% ethanol was added 3.9 g. (0.0125 mole) of S-methyl isothiourea sulfate. The mixture was refluxed overnight, concentrated to dryness and the residue recrystallized from methanol to afford 6.0 g. (85% of product, M.P. 230–233° C.

*Analysis.*—Calcd. for $C_{24}H_{56}N_{10}SO_4$: N, 24.13; S, 5.52. Found: N, 22.29; S, 5.59.

Example 7.—[beta-(octahydro-1-azocinyl)-ethyl]-hydrazine

To 300 ml. of refluxing 85% hydrazine hydrate was added a solution of 21 g. (0.10 mole) of [2-(octahydro-1-azocinyl)-ethyl] chloride hydrochloride in 300 ml. of water over six hours. Refluxing was continued overnight followed by concentration by distillation to a turbid residue. Excess sodium hydroxide was added to the residue and three 50 ml. tetrahydrofuran extractions were carried out. The combined organic layers were dried over potassium carbonate, the solvent was removed, and the residue was distilled to afford 11.2 g. (65%) of product taken at 82–85° C./0.030 mm.

*Analysis.*—Calcd. for $C_9H_{21}N_3$: N, 24.54. Found: N, 23.27.

*Example 8.—N-amino-N-[beta-(octahydro-1-azocinyl)-ethyl]-guanidine sulfate*

A solution containing 6.9 g. (0.025 mole) of S-methyl-isothiourea sulfate and 10.0 g. (0.055 mole) of [beta-(octahydro-1-azocinyl)-ethyl] hydrazine in 150 ml. of ethanol was refluxed 15 hours and concentrated to dryness in vacuo. The residue was dissolved in hot ethanol and again the solution was taken to dryness. The resulting crude product was recrystallized from ethanol to afford 11.5 g. (88%) of pure material, M.P. 235–238° C. (d).

Analysis.—Calcd. for $C_{20}H_{48}N_{10}SO_4$: S, 6.12. Found: S, 6.36.

*Example 9.—1,2,2,6,6-pentamethyl-4-piperidone*

Methyl iodide (56 g.) (0.4 mole) and 31 g. (0.2 mole) of triacetone amine were dissolved in 100 ml. of heptane and allowed to stand at room temperature for one week. The solvent was decanted from the crude triacetone amine hydroiodide which separated, the heptane removed, and the residue distilled to afford 13 g. (39%) of product, B.P. 97–102° C./14 mm.

*Analysis.*—Calcd. for $C_{10}H_{19}ON$: N, 8.28. Found: N, 8.34.

*Example 10.—1,2,2,7,7-pentamethylhomopiperazinone-4*

To a solution of 70 g. (0.40 mole) of 1,2,2,6,6-pentamethyl-4-piperidone in 200 ml. of chloroform was added 150 ml. of concentrated sulfuric acid at 0–5° C. followed by 58 g. (0.80 mole) of sodium azide in small portions with stirring. The mixture was heated to 45° C. for one hour. After pouring over ice, addition of excess potassium carbonate, and excess potassium hydroxide, the resulting emulsion was filtered and allowed to stratify. The layers were separated and the aqueous phase extracted twice with 50 ml. portions of chloroform. The combined organic extracts were dried over sodium sulfate. After separating the drying agent, the solvent was removed under vacuum and the residue collected and thoroughly washed with n-hexane to afford after drying, 55 g. (69%) product, M.P. 140–145° C.

*Analysis.*—Calcd. for $C_{10}H_{19}N_2O$: N, 15.22; NE, 184. Found: N, 15.04, NE, 183.7.

Example 11.—*1,2,2,7,7-pentamethylhomopiperazine*

To 22 g. (0.58 mole) of lithium aluminum hydride in 500 ml. of tetrahydrofuran at reflux was added 55 g. (0.29 mole) of the product from Example 10 in 300 ml. of tetrahydrofuran and the resulting mixture was stirred and refluxed for 20 hours. Water (50 ml.) followed by 100 ml. of 40% potassium hydroxide were slowly added and the precipitate which formed was removed by filtration and washed with tetrahydrofuran. The combined filtrates were dried over calcium carbonate. The drying agent and solvent were removed and the residue was fractionated through an 8″ column to afford as a major fraction 30 g. (58%) of product, B.P. 46–48° C./0.2 mm.

*Analysis.*—Calcd.: $C_{10}H_{22}N_2$: N, 16.47. Found: N, 16.40.

Example 12.—*1,2,2,7,7,-pentamethyl-4-(beta-hydroxyethyl)-homopiperazine*

To 30 g. (0.18 mole) of the base obtained in Example 11 was added 10 g. of ethylene oxide in 100 ml. of methanol in a citrate bottle. Concentrated hydrochloric acid (0.5 ml.) was added and the bottle quickly stoppered and then heated to about 100° C. for 2.5 hours. The solvent was removed under vacuum and the residue fractionated through a 3″ column to give as a major portion 33 g. (86%) of product, B.P. 156–158° C./20 mm.

*Analysis.*—Calcd. for $C_{12}H_{26}N_2O$: N, 13.08. Found: N, 12.81.

Example 13.—*1,2,2,7,7-pentamethyl-4-(beta-chloro ethyl)-homopiperazine dihydrochloride*

To 35 g. (0.16 mole) of 1,2,2,7,7-pentamethyl-4-(beta-hydroxyethyl)-homopiperazine in 250 ml. of chloroform was added hydrogen chloride gas to pH 2–3. To this mixture was then added 40 g. (0.33 mole) of thionyl chloride dropwise over one hour. The mixture was stirred and refluxed for eight hours. The solvent and excess thionyl chloride were removed under vacuum and the residue was dissolved in about 500 ml. of hot ethanol and excess dry ethyl ether was added to induce precipitation of the product. The precipitate was collected, washed with ether and dried to afford 41 g. (84%) of product, M.P. 238–240° C.

*Analysis.*—Calcd. $C_{12}H_{27}N_2Cl_3$: N, 9.17; Cl, 23.24. Found: N, 9.11; Cl, 23.23.

Example 14.—*1,2,2,7,7-pentamethyl-4-(beta-hydrazino ethyl)-homopiperazine*

To 300 ml. of refluxing 85% hydrazine hydrate was added a solution of 15 g. (0.050 mole) of 1.2,2,7,7-pentamethyl-4 - (beta-chloroethyl) - homopiperazine dihydro chloride in 500 ml. of cold water over 3.5 hours with stirring. After refluxing an additional 16 hours the mixture was concentrated under vacuum to an emulsion and saturated with sodium hydroxide. Three extractions with 150 ml. portions of tetrahydrofuran were carried out, and the organic layers combined and dried over calcium carbonate. The drying agent and solvent were removed, and the residue fractionated through a 3″ column to give a major fraction of 10.5 g. (92%) of product, boiling point 96–100° C./0.01 mm.

*Analysis.*—Calcd. for $C_{12}H_{28}N_4$: N, 24.56. Found: N, 23.19.

Example 15.—*N-amino-N-[beta-(1,2,2,7,7-pentamethyl-4-homopiperazinyl)ethyl]-guanidine sulfate*

The product from Example 14 (4.6 g., 0.020 mole) was added to 2.8 g. (0.010 mole) of S-methyl isothiourea sulfate and 25 ml. of 70% ethanol and the mixture was refluxed for 16 hours. The solvent was removed under vacuum and the residue was recrystallized from ethanol to afford 6.3 g. (85%) of product, M.P. 196–200° C.

*Analysis.*—Calcd. for $C_{26}H_{62}N_{12}SO_4$: N, 26.33; S, 5.01. Found: N, 26.06; S, 5.22.

Various changes and modifications of the invention can be made and, to the extent that such variations incorporate the spirit of this invention, they are intended to be included within the scope of the appended claims.

What is claimed is:
1. A compound of the formula

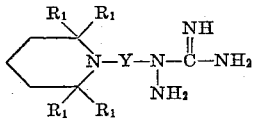

wherein $R_1$ is lower alkyl and Y is lower alkylene of at least two carbons between the nitrogens to which it is bonded.

2. N-amino-N-[beta-(2,2,6,6 - tetramethylpiperidino)-ethyl]-guanidine.

References Cited
UNITED STATES PATENTS

| | | | |
|---|---|---|---|
| 2,317,545 | 5/1967 | Albrecht et al. | 260—293 |
| 3,189,599 | 6/1965 | Mull | 260—239 |
| 3,098,066 | 7/1963 | Mull | 260—239 |
| 3,006,913 | 10/1961 | Mull | 260—239 |

OTHER REFERENCES

Degering: Organic Nitrogen Compounds (Michigan, 1950), pp. 378, 383–384, and 388.

ALTON D. ROLLINS, *Primary Examiner.*